United States Patent [19]

McClain

[11] 4,287,333
[45] * Sep. 1, 1981

[54] PROCESS OF PREPARING FINELY DIVIDED THERMOPLASTIC RESINS

[75] Inventor: Dorothee M. McClain, Cincinnati, Ohio

[73] Assignee: National Distillers and Chemical Corp., New York, N.Y.

[*] Notice: The portion of the term of this patent subsequent to Jun. 17, 1997, has been disclaimed.

[21] Appl. No.: 71,155

[22] Filed: Aug. 27, 1979

Related U.S. Application Data

[63] Continuation of Ser. No. 934,646, Aug. 17, 1978, Pat. No. 4,208,528.

[51] Int. Cl.³ .................................................. C08F 6/24
[52] U.S. Cl. ..................................... 528/487; 525/56; 525/62; 536/56
[58] Field of Search ........................ 528/487; 536/56; 525/62

[56] References Cited

FOREIGN PATENT DOCUMENTS 88404  3/1971  German Democratic Rep. .

Primary Examiner—Stanford M. Levin
Attorney, Agent, or Firm—Kenneth D. Tremain

[57] ABSTRACT

Powders of thermoplastic resins such as polyethylene homopolymer and ethylene-vinyl acetate copolymer are obtained by agitating molten resin in admixture with water and in the presence of a dispersing amount of an alkali metal salt of an organophosphate ester. The particle size distribution of the dispersed resin can, if desired, be regulated by the addition of base thereto.

11 Claims, No Drawings

PROCESS OF PREPARING FINELY DIVIDED THERMOPLASTIC RESINS

This is a continuation of application Ser. No. 934,646, filed Aug. 17, 1978, now U.S. Pat. No. 4,208,528.

BACKGROUND OF THE INVENTION

1. Field of the Invention

This invention belongs to the field of processes for providing thermoplastic resins in fine powder form and, more particularly, to such processes in which the powders are obtained from aqueous dispersions of resin.

2. Description of the Prior Art

Thermoplastic resins in finely-divided form have found use in a number of applications where it is either impossible or inconvenient to utilize the more conventional cube or pellet forms. For example, powdered organic polymeric thermoplastic resins in dry form have been used to coat articles by dip coating in either a static or fluidized bed, by powder coating wherein the powder is applied by spraying or dusting, and by flame spraying. In dispersed form, thermoplastic resin powders have been applied as coatings by roller coating, spray coating, slush coating, and dip coating to substrates such as metal, paper, paperboard, and the like. These powders have also been widely employed in conventional powder molding techniques. Other applications of these powders include paper pulp additives; mold release agents for rubber; additives to waxes, paints, and polishes; binders for non-woven fabrics; and so on.

It is well known that high molecular weight thermoplastic resins, for example, polyethylene and ethylene copolymers, may be converted to dispersions of spherically shaped particles which are substantially devoid of particles greater than 25 microns in diameter and in which the number average particle diameter is less than about 10 microns. Thus, McClain U.S. Pat. No. 3,422,049 teaches that such dispersions of finely divided particles may readily be prepared by agitating the molten resin in admixture with water at elevated temperatures and at autogeneous pressure, in the presence of certain dispersing agents which are particular block copolymers of ethylene oxide and propylene oxide. The non-agglomerated spherical particles can be recovered as powders by cooling the dispersions below about 100° C. and collecting the suspended material by filtration or centrifugation.

U.S. Pat. No. 3,418,265 further teaches that the particle size of such thermoplastic resin dispersions can be reduced still further, to the sub-micron level, while retaining the unique spherical particle shape by including in the dispersions process a volatile, inert, water-insoluble organic liquid that is soluble in the thermoplastic resin in an amount between 0.5 and 20 parts per 100 parts of the resin, whereupon a stable, aqueous, film-forming latex is ultimately obtained as the final product. Alternatively, U.S. Pat. No. 3,522,036 teaches that stable film-forming aqueous latices of high molecular weight polyethylene can also be formed by including a liquid vinyl monomer such as styrene in the dispersion process.

Although the foregoing dispersion procedures are conveniently operated as batch processes, it is also known to produce such finely divided powders in a sequential, continuous dispersion process. See, e.g., U.S. Pat. No. 3,432,483.

U.S. Pat. No. 3,586,654 teaches that it is further possible to conduct the dispersion process in such a way that the polymer particles may be further transformed into spherical particles of controlled average size and size distributions which are the same, larger or smaller than the starting particles. If desired, the dispersion process can be modified in such a manner as to produce spherical foamed particles (U.S. Pat. No. 3,472,801), or to incorporate within the particles certain colorants (U.S. Pat. No. 3,449,291) and pigments (U.S. Pat. No. 3,674,736).

The fine powders are, by virtue of their small particle size, narrow particle size range, and spherical particle shape, unique states of matter which cannot readily be prepared by other conventional processes known in the art. The advantages and utility of such fine powders has been described in many of the aforesaid patent disclosures. In addition, it has been found that various substrates can be coated by applying the above described dispersions of polyolefin fine powders in an inert carrier, heating to evaporate the carrier, and fusing the polyolefin to the substrate (U.S. Pat. No. 3,432,339). Further, U.S. Pat. No. 3,669,992 teaches a process for preparing colored polymer powders having controlled charge and printing characteristics of value as toners in electrostatic printing.

SUMMARY OF THE INVENTION

In accordance with this invention a normally solid thermoplastic resin is rapidly dispersed under conditions of rapid mixing in water heated to a temperature at or above the melting point of the resin, employing as dispersing agent, at least one alkali metal salt of an organophosphate ester, and following cooling of the aqueous dispersion to a temperature which is below about 100° C., the resin is recovered therefrom as a finely divided powder. The use of alkali metal salts of organophosphate esters as dispersing agents herein generally provides resin particles which are larger than those obtained by the use of the block copolymers of ethylene oxide and propylene oxide heretofore employed as dispersing agents and affords wider ranges of resin particle size than those attainable with the latter dispersants without, however, requiring the use of large amounts of dispersant. In addition, the dispersing agents herein substantially avoid the, at times, objectionable ultrafine (about 10 microns or less) resin particle fractions which can be produced by the aforementioned block copolymers of ethylene oxide and propylene oxide.

Briefly stated, the invention herein provides a process for preparing in a finely divided form a solid organic polymeric thermoplastic resin which comprises: (a) agitating a mixture of the resin while in the molten state, a dispersion-forming amount of water, and a dispersion-forming amount of an alkali metal salt of an organophosphate ester dispersing agent, to provide an aqueous dispersion of the resin; and, (b) cooling the dispersion to below about 100° C. to provide solid particles of resin.

The cooled dispersion of resin powder can be directly employed in various applications or the resin powder can be recovered therefrom using known and conventional procedures such as filtration and centrifugation.

It is also within the scope of this invention to include small quantities of a base such as an alkali metal hydroxide in the dispersion process of paragraph (a) in order to regulate the particle size distribution of the dispersed particles. In this manner, individual lots of resin powders can be produced which have optimum particle size distributions for given applications.

DESCRIPTION OF THE PREFERRED EMBODIMENTS

In general, the polymers suitable for the practice of this invention include any normally solid synthetic organic polymeric thermoplastic resin whose decomposition point is somewhat higher than its melting point and somewhat less than the critical temperature of water. Included are polyolefins, vinyls, olefin-vinyl copolymers, olefin-allyl copolymers, polyamides, acrylics, polystyrenes, cellulosics, polyesters and fluorocarbons.

The polyolefins most suitable for the practice of this invention include normally solid polymers of olefins, particularly mono-alpha-olefins, which comprise from two to about six carbon atoms, e.g., polyethylene, polypropylene, polybutene, polyisobutylene, poly (4-methylpentene), and the like. Preferred polyolefin feeds are polyethylene and polypropylene.

Vinyl polymers suitable for use in this invention include polyvinyl chloride, polyvinyl fluoride, vinyl chloride/vinyl acetate copolymers, and polyvinylidene chloride and fluoride.

Suitable olefin-vinyl copolymers include ethylene-vinyl acetate, ethylene-vinyl propionate, ethylene-vinyl isobutyrate, ethylene-vinyl alcohol, ethylene-methyl acrylate, ethylene-ethyl acrylate, ethylene-ethyl methacrylate, and ethylene-acrylic acid, ethylene-methacrylic acid and their salts. Especially preferred are ethylene-vinyl acetate copolymers wherein the ethylene constitutes at least about 25%, preferably at least about 50%, of the copolymer by weight.

Olefin-allyl copolymers include ethylene-allyl alcohol, ethylene-allyl acetate, ethylene-allyl acetone, ethylene-allyl benzene, ethylene-allyl ether, ethylene-acrolein, and the like. Ethylene-allyl alcohol is especially preferred.

Preferred among the polyamides are linear superpolyamide resins, commonly referred to as nylons such polymers can be made by the intermolecular condensation of linear diamines containing from 6 to 10 carbon atoms with linear dicarboxylic acids containing from 2 to 10 carbon atoms. Equally well, the superpolyamides may be made from amide-forming derivatives of these monomers such as esters, acid chlorides, amine salts, etc. Also suitable are superpolyamides made by the intramolecular polymerization of omega-amino-acids containing 4 to 12 carbon atoms and of their amide-forming derivatives, particularly the internal lactams. Examples of specific nylons are polyhexamethylene adipamide, polyhexamethylene sebacamide, and polycaprolactam. Especially preferred are nylons having intrinsic viscosities ranging between 0.3 and 3.5 dl./g. determined in m-cresol.

Acrylic resins suitable for use in this invention include polymethyl methacrylate, polyacrylonitrile, polymethyl acrylate, polyethyl methacrylate, etc. Preferred is polymethyl methacrylate.

The dispersing agents of the present invention are water-soluble alkali metal salts of organophosphate esters. The term "organophosphate ester" is taken broadly to embrace a diversity of predominantly partially esterified phosphorus containing surface active materials, including alkyl orthophosphates, e.g., mono (2-ethylhexyl) orthophosphate and di(2-ethylhexyl) orthophosphate and mixtures thereof, as well as partial esters of polyphosphoric acids, glycerophosphoric acid, sugar phosphates, phosphatidic acids having long-chain fatty acyl groups, amino phosphoric acids, and partial phosphate esters of nonionic surfactants. Of all these phosphate ester surfactants, the partial phosphate esters of nonionic surfactants are preferred.

The nonionic surfactants themselves are ethoxylated long-chain linear fatty alcohols, e.g., alcohols containing 8 to 22 carbon atoms, preferably 12 to 18 carbon atoms; such alcohols ethoxylated with 2 to 20 oxyethylene units preferably 2 to 10 oxyethylene units; or ethoxylated alkylphenols, wherein the alkyl group is a linear or branched aliphatic chain containing 6 to 12, preferably 8 to 10, carbon atoms, and the phenolic hydroxyl group is ethoxylated with about 2 to 20, preferably 4 to 8 oxyethylene groups. The aforesaid nonionic surfactants are themselves substantially ineffective in dispersing polyethylene and the ethylene copolymers of this invention. The partial phosphate ester products of the said nonionic surfactants are mainly mixtures of monoesters and diesters of orthophosphoric acid, but may contain minor amounts of the triester and other structures, e.g.,

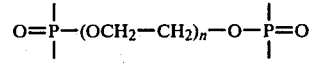

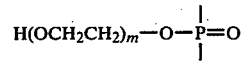

By varying the phosphating conditions, mixtures rich in mono- or diesters may be obtained.

In general, the preferred partial esters of nonionic surfactants are obtained commercially in the free acid form, but before use as a dispersant in the process of this invention, they are carefully and completely neutralized with an inorganic base such as sodium hydroxide or potassium hydroxide, although it is within the scope of the invention to accomplish the neutralization with an organic base such as triethylamine, benzyltrimethylammonium hydroxide, etc. The amount of base required for complete neutralization is determined by means of a potentiometric titration, and excess base beyond the amount required for neutralization is usually avoided unless variation in particle size is desired.

Exemplary and preferred partial phosphate ester dispersants include, for example, phosphated polyoxyethylated nonylphenols; cetyl phosphates and oxyethylated cetyl phosphates; mono or di phosphate esters made from aromatic (phenols) or linear alcohols, usually polyoxyethylated; and phosphated fatty glycols. Commercial dispersants and their sources include:

Triton QS44 (Rohm and Haas Company, Philadelphia, PA)—a liquid phosphate ester preparation, 80% solids, in the free acid form.

Crodafos N3 Acid and N10 Acid (Croda, Inc., New York, NY)—oleyl ether phosphates in paste form.

Crodafos SG (Croda, Inc.)—a cetyl ether phosphate in liquid form.

Maphos 8078 and 8135 (Mazer Chemicals, Inc., Gurnee, IL)—aromatic phosphate esters (both mono- and diesters) made from polyethoxylated linear and aromatic alcohols of varying chain lengths.

Wayfos MION and DION (Philip A. Hunt Chemical Corp., East Providence, RI)—phosphate esters (mono- and di-) derived from polyoxyethylated nonylphenol.

Consolevel HT (Consos, Inc., Charlotte, NC)—phosphated fatty glycol.

The dispersing agents of the present invention, by functioning effectively from temperatures as low as the melting point of low density polyethylene, i.e., about 115° C. up to as high as 325° C., are not limited to the dispersion of low molecular weight low density polyethylenes. For example, high molecular weight low density polyethylenes, linear polyethylene, polypropylene, polyvinyl chloride, ethylene-vinyl acetate copolymers, ethylene-allyl alcohol copolymers, nylon and the like can be readily dispersed by means of the subject novel dispersing agents to dispersions substantially devoid of particles larger than 500 microns and wherein the particles have a relatively narrow size range. Where it is desired to prepare the finest dispersion of a given polymer, the dispersion temperature should be such that the resin being dispersed exhibits a melt flow rate (ASTM D1238, hereinafter Condition E unless otherwise specified) of greater than 15, and more preferably, greater than 20. Where larger average particle sizes are desired or acceptable, however, dispersion temperatures may be employed, still in combination with only relatively mild agitation, at which the polymer exhibits a melt flow rate appreciably lower than 15, for example, as low as about 2.

The temperature of operation is dependent upon the melting point, melt flow properties, decomposition temperature, and desired fineness of dispersion of the selected synthetic organic thermoplastic resin. While such resins can be dispersed at temperatures commencing with their respective melting points, increases in dispersion temperature beyond the melting point and up to the decomposition of the resins are generally accompanied by corresponding increases in the fluidity of the molten resin. As the fluidity of the melt increases, the dispersions generally tend to develop lower average particle sizes without requiring increases in agitation effort.

The dispersing apparatus or device may be any device capable of delivering at least a moderate amount of shearing action under elevated temperatures and pressures to a liquid mixture. Suitable, for example, are conventional autoclaves equipped with conventional propeller stirrers. Propellers designed to impart greater shear to the mixture tend to improve the recovered yield of pulverulent polymer, but with little effect on the particle size and distribution of recovered polymer. The particle size and distribution are somewhat dependent on the stirring rate, higher stirring speeds resulting in finer and narrower dispersions until an optimum speed is reached above which there is little change. The overall recovery yield of pulverulent polyolefin from the dispersion is dependent upon the duration of stirring. For a given type and rate of stirring, a period of stirring exists within which maximum recoverable yields of pulverulent polyolefins result. Either shorter or longer periods of shearing result in lower recoverable yields. Preferred stirring periods generally will range from about 1 to 20 minutes, and preferably from about 5 to 15 minutes. It will be understood, however, that the stirring rates and periods will depend upon the type of equipment utilized. While the rate and duration of agitation affect particle size and distribution and recoverable yields of pulverulent polymer, these variables can be readily optimized for any given polyolefin through simple, routine experimentation.

In carrying out the subject process, the selected synthetic organic thermoplastic polymer is first contacted with water and the dispersing agent. It is a particularly advantageous feature of this invention that the dispersing agent need not be incorporated into the polymer prior to the introduction of the water by such means as milling and the like, but may be introduced into the dispersing apparatus simultaneously with the other ingredients or as a solution in the aqueous phase. If desired, the dispersion process may be operated in a continuous manner, in which case it is convenient to premix the desired ratio of dispersing agent, water, and polymer, and introduce this mixture continuously to the reactor while continuously removing from another part of the reactor the product dispersion.

The amount of water used in relation to the polymer dispersed generally ranges from about 0.1 to about 10.0 parts by weight of water per part of normally solid polymer. Higher ratios are operable but uneconomical whereas lower ratios, although usable, present operational difficulties. The preferred range is between about 0.2 and about 5.0 parts per part of polymer.

The amount of dispersing agent should be sufficient to provide a dispersion of the resin in the water under the selected conditions. Very good dispersions can be obtained at amounts within the range of from 2 to about 25 weight parts dispersing agent per 100 weight parts of resin and as such, these amounts are preferred. There is no upper limit on the amount of dispersing agent which can be employed except that exceeding the amount beyond that required to provide an acceptable dispersion may be economically wasteful.

As previously stated, a base can be included in the dispersion process to regulate the particle size distribution of the resin. The term "base" as employed herein refers to alkali metal hydroxides, e.g., sodium hydroxide and potassium hydroxide, and salts of alkali metals which in a 1.0 molar solution, exhibit a pH of about 11.0 or higher, e.g., sodium phosphate and sodium carbonate. Sodium hydroxide is especially preferred. The particle size-adjusting amount of base to be employed for a given resin can be readily determined by simple and routine experimentation. Even as small an amount as about 0.6 weight parts per 100 weight parts of resin will decrease the particle size. There also exists an optimum amount of base for minimum particle size, i.e., larger amounts of base added to the dispersion will again increase the particle size. The amount, of course, will vary with different dispersing agents. Generally the amount of base included in the process will vary from about 0.1 to about 6.0 weight parts per 100 weight parts of resin. Further, amounts of base above 6 weight parts per 100 weight parts of resin can be used but with care if the polymer is susceptible to reaction with base under the dispersing conditions used. Ordinarily, however, there is little advantage to be gained in using the larger amounts of base and such should generally be avoided as unnecessary and wasteful.

The temperature for forming the hot aqueous resin dispersion can range from about 100°0 C. to about 270° C. with temperatures of from about 150° C. to about 250° C. being preferred.

The pressure under which the present process is carried out is so adjusted to exceed the vapor pressure of water at the operating temperature so as to maintain a liquid water phase. More particularly, the pressures may range from about 1 to 217 atmospheres, and preferably from about 6 to 120 atmospheres. In cases where the polymer is sensitive to air at the elevated dispersion temperature, an inert gas, e.g., nitrogen or helium, may be substituted for the air normally present, and deaerated water used. When heat-sensitive polymers, e.g., polyvinyl chloride, are to be dispersed, heat stabilizers in sufficient amounts are included in the dispersion process. Plasticizers, lubricants, anti-oxidants, and the like may also be included. Mixtures of polymers may also be dispersed.

The dispersions resulting from the above process are compositions comprising a dispersion of a normally solid synthetic organic polymeric thermoplastic resin in water in the presence of a minor amount of dispersing agent. If the dispersion is capable of forming a continuous film upon removal of the aqueous phase by evaporation, it is more definitely termed a latex. The above dispersions or latices can be utilized in coating metal or paper, in polish formulations, in paint formulations, for textile sizing and waterproofing, for coating fibers, etc.

In the case of dispersions which are not latices, the temperature of the dispersion may be lowered to below about 100° C., and the polymer separated from the aqueous phase in the form of discrete particles by filtration, evaporation of the water, and the like. It is an outstanding feature of this invention that the finely-divided polymer recovered after several washings with water contains comparatively little residual dispersing agent and, consequently, requires no subsequent treatment where the presence of such residues would be considered undesirable. The aqueous filtrate and washings contain substantially all of the dispersing agent originally added, in unchanged form, and thus may be recycled to act as the dispersion medium for subsequent batches of polymer.

Drying of the recovered finely-divided polymer yields a free-flowing powder of fine particle size and narrow particle size distribution. Generally, all of the dispersed particles have diameters less than about 500 microns. By varying the composition of the subject novel dispersing agents and the ratio of polymer to water, average particle size ranging from about 300 microns to as low as about 10 microns or below can be obtained. Especially preferred are particles of narrow size distribution wherein the number of average particle size is less than about 150 microns, and more desirably less than about 50 microns, but not less than about 10 microns.

The finely-divided polymers of this invention are superior in powder form for static or fluidized dip coating, spraying, dusting, and flame spraying applications as well as for preparing stable dispersions in water or some other medium for use in roller, dip, or spray coating. The relatively high molecular weight polymers of this invention also find use in the preparation of heat resistance coatings, in the preparation of molded or formed shapes by powder or slush molding techniques, and in the preparation of foams in combination with conventional blowing agents.

Latices can be prepared within the framework of this invention through the use of a combination of selected polymers or copolymers and particular dispersing conditions. Included among the polymers and copolymers suitable for dispersion to latices are low density polyethylenes having a melt flow rate above about 3000, and particularly between about 4000 and 10,000. Also included are copolymers of ethylene and vinyl acetate wherein the ethylene constitutes at least 25 percent, and preferably at least 50 percent by weight of the final copolymer, and wherein the copolymers exhibit at 190° C. melt flow rates of at least 15, and preferably between about 25 and 7,000. Dispersion temperatures suitable for producing the above latices are generally above about 160° C., and preferably range from about 175° to 225° C.

The resultant latices by definition deposit continuous films when the aqueous medium is permitted to evaporate under uniform and mild conditions, such as in air at ambient temperature and atmospheric pressure. This property imparts important and useful value to the latices which can be used for applying continuous film coatings at ambient temperature to substrates such as paper, paperboard, metal foil, glass, plastic film or sheet, and the like, and for waterproofing fibers and textiles.

The following examples will further illustrate this invention without limitation. All parts are by weight unless otherwise indicated.

The materials employed in these examples are as follows:

| COMPONENT | DESCRIPTION |
| --- | --- |
| Petrothene 202 | U.S. Industrial Chemicals Co. polyethylene of melt index (ASTM D1238-65T Condition E): 22.0 g/10 min.; density: .915 g/cc |
| Petrothene LS-630 | U.S. Industrial Chemicals Co. polyethylene of melt index (ASTM D1238-65T Condition E): 28.0 g/10 min.; density: .962 g/cc |
| Na-salt of Triton QS-44 | Made by careful neutralization of the phosphate surfactant in free acid form (Rohm & Haas Co.), 81% active |
| Na-salt of Crodafos N-10 | Made by careful neutralization of the phosphate surfactant in free acid form (Croda Chemicals Ltd.), 100% active |
| Na-salt of Consolevel HT | Made by careful neutralization of the phosphated fatty glycol of 45% concentration from Consos Inc. |
| Na-salt of Wayfos D-10-N | Made by careful neutralization of the complex organic (aromatic) phosphate ester in free acid form of 100% concentration (Philip A. Hunt Chemical Corp.) |
| Na-salt of Wayfos M-10-N | Made by careful neutralization of the complex organic (aromatic) phosphate ester in free acid form of 100% concentration (Philip A. Hunt Chemical Corp.) |

The dispersion apparatus comprises a cylindrical one-liter, 4-inch diameter pressure reactor (Parr Instrument Company) equipped with a thermowell, a safety head, a stirrer bearing and shaft, and a pressure gage. Power was supplied to the stirrer by means of a fractional horse-power motor. The stirring propeller comprised two curved tooth turbine-type discs (3-inch diameter).

The resin powders of the examples were analyzed by one of two procedures. In accordance with one procedure, the powders were sieved by means of appropriate ASTM screens. The results of the sieving analyses are expressed in weight percent. The other analytical procedure involved the use of an electronic Coulter counter and was particularly useful where a more precise count was desired and with dispersions such as latices where sieving and microscopic counts were impractical. The Coulter counter determines the number and volume of particles suspended in an electrically conductive liquid as these particles flow singularly through a small aperture having an immersed electrode on each side. As a particle passes through the aperture, it displaces electrolyte within the aperture and thereby momentarily changes the resistance between the electrodes, causing a voltage pulse of magnitude proportional to the volume of the particle. The pulses for the particles of the sample are electrically amplified, scaled, and counted. From these counts, generally made on several million particles, accurate distribution curves of both number and weight percent can be established. Results are expressed in terms of the largest and smallest particles counted, the 25, 50 and 75 weight percentile size, and the number average particle size.

sodium salt of Crodafos N-10. The foregoing dispersing agents as well as the resulting particle size distributions are listed in TABLE I as follows:

TABLE I

| DISPERSING AGENT | | | PRODUCT Sieve Analysis of Particles with a Diameter Below 500 Microns, in Wt. Percent | | | | | | |
|---|---|---|---|---|---|---|---|---|---|
| NAME | TYPE | AMT. g | YIELD % | BELOW 37 MICRONS | 37–53 MICRONS | 53–106 MICRONS | 106–149 MICRONS | 149–250 MICRONS | 250–420 MICRONS | LARGER THAN 420 MICRONS |
| Na-salt of Triton QS-44 | Anionic | 15.4 | 100 | | 41.0 | | 20.4 | 9.1 | 14.7 | 14.7 |
| Na-salt of Crodafos N-10 | Anionic | 15.7 | 100 | 15.4 | 20.9 | 31.3 | 21.9 | 6.2 | 2.0 | 2.0 |

EXAMPLE 2

A series of dispersions were prepared from a solid ethylene-vinyl acetate copolymer according to the technique described in EXAMPLE 1. The copolymer used was Vynathene EY 901 (U.S. Industrial Chemicals Co.) which contains about 40% vinyl acetate by weight and has a melt flow rate (ASTM D1238-65% Condition E) of about 7.4 g/10 min. A variety of dispersing agents were used with the results given in TABLE II as follows: (Particle size analysis was made on the Coulter Counter)

TABLE II

| Dispersing Agent | | | | Product | | | | | |
|---|---|---|---|---|---|---|---|---|---|
| Name | Type | Amt. g | Water ml | Yield % | Largest Particle (Microns) | Smallest Particle (Microns) | 25 Wt. % of Particles Below (Microns) | 50 Wt. % of Particles Below (Microns) | 75 Wt. % of Particles Below (Microns) | Number Average (Microns) |
| Na-salt of Triton QS-44 | Anionic | 15.4 | 450 | 100 | Fine dispersion; not analyzed | | | | | |
| Na-salt of Consolevel HT | Anionic | 33.5 | 450 | 100 | 161 | 16 | 76 | 97 | 122 | 68.6 |
| Na-salt of Wayfos D-10-N | Anionic | 15.6 | 450 | 100 | 161 | 16 | 64 | 85 | 101 | 62.8 |
| Na-salt of Wayfos M-10-N | Anionic | 15.6 | 450 | 100 | Fine dispersion; not analyzed | | | | | |
| Na-salt of Crodafos N-10 | Anionic | 15.7 | 450 | 100 | 102 | 8 | 43 | 55 | 83 | 32.1 |

EXAMPLE 1

150 parts of a polyethylene having a density of 0.915 g/cc and a melt index (ASTM D1238-65T Condition E) of 22.0 g/10 min., in the form of pellets 15.4 parts of the sodium salt of Triton QS-44, and 450 ml. deionized water were charged to the reactor. Heat was applied until the temperature of the mixture reached 200° C. at a pressure of 235 psi. Stirring was then started at a rate of 370 rpm and continued during the cooling period which started immediately after the temperature had reached 200° C. and lasted about 15 minutes until the temperature had dropped below 100° C. The residual pressure was then bled off, the obtained dispersion was suction-filtered on a Buchner funnel fitted with a #541 Whitman filter paper. The residue was washed thoroughly with water and dried for 4 hours at 60° C. The dried polyethylene residue comprised 150 parts of a fine, white powder. A sieve analysis gave the following particle size distribution: 41.0 weight percent passing 106 microns, 61.4 weight percent passing 149 microns, 70.5 weight percent passing 250 microns, 85.2 weight percent passing 420 microns and 100 weight percent passing 500 microns.

The same operating conditions of the above run were employed using the same polyethylene but with the

EXAMPLE 3

150 parts of a linear polyethylene having a density of 0.962 g/cc and a melt index (ASTM D1238, Condition E) of 28.0 g/10 min. in the form of pellets was dispersed according to the technique described in EXAMPLE 1. 33.5 parts of the sodium salt of Consolevel HT were used in 432 parts water.

65 weight percent of the resin was dispersed and had the following particle size distribution: 19.8 wt. percent passed 106 microns, 60.0 wt. percent passed 149 microns, 99.2 wt. percent passed 250 microns and 100 wt. percent passed 420 microns.

EXAMPLE 4

The effect of varying amounts of sodium hydroxide on the particle size distribution of high and low density polyethylene dispersions made with the sodium salt of Triton QS-44 is shown in TABLE III. The technique employed in the dispersion is described in EXAMPLE 1. Amounts of sodium hydroxide added to the dispersion mix before heating and dispersion are listed in TABLE III together with the resulting particle size distribution.

TABLE III

Charge: 450 ml water
150 g Polyethylene
15.4 g Na-salt of Triton QS-44 (76.7% active)
Sodium hydroxide as indicated
Temp: 200° C.

| Polymer Type | NaOH g | Yield of Particles <500μ % | Sieve Analysis of Particles with a Diameter Below 500 Microns, in Wt. % | | | | |
|---|---|---|---|---|---|---|---|
| | | | Below 106 Microns | 106–149 Microns | 149–250 Microns | 250–420 Microns | Larger than 420 Microns |
| Petrothene 202 | — | 100 | 41.0 | 20.4 | 9.1 | 14.7 | 14.7 |
| Petrothene 202 | 2 | 100 | 64.7 | 27.5 | 6.4 | 1.4 | — |
| Petrothene 202 | 4 | 100 | 54.5 | 32.0 | 9.6 | 1.9 | 1.9 |
| Petrothene LS-630 | 2 | 80 | 6.4 | 13.1 | 60.9 | 19.6 | — |
| Petrothene LS-630 | 4 | >90 | 9.6 | 21.0 | 42.5 | 26.8 | — |

In general, the effect of the sodium hydroxide was to reduce the particle size distribution of the dispersed polyethylene resin as measured by sieve analysis.

What is claimed is:

1. a process for preparing in finely divided form a solid organic polymeric thermoplastic resin consisting of:
   (a) agitating a mixture of the resin while in the molten state, a dispersion-forming amount of water, and a dispersion-forming amount of an alkali metal salt of an organo-phosphate ester dispersing agent, to provide a hot aqueous dispersion of the resin; and,
   (b) cooling the dispersion to below about 100° C. to provide solid particles of resin.

2. The process of claim 1 wherein solid particles of resin produced in step (b) are recovered from the aqueous dispersion.

3. The process of claim 1 wherein the resin is a polyolefin.

4. The process of claim 1 wherein the resin is polyethylene or polypropylene homopolymer or copolymer.

5. The process of claim 1 wherein the resin is ethylene-vinyl acetate copolymer.

6. The process of claim 1 wherein the alkali metal salt of the organophosphate ester dispersing agent is the sodium salt of said ester.

7. A process for preparing in finely divided form a solid organic polymeric thermoplastic resin consisting of:
   (a) agitating a mixture of the resin while in the molten state, a dispersion-forming amount of water, and a dispersion-forming amount of an alkali metal salt of an organophosphate ester dispersing agent in the presence of a base to regulate the particle size distribution of the dispersed resin; and,
   (b) cooling the dispersion to below about 100° C. to provide solid particles of resin of controlled particle size distribution.

8. The process of claim 7 wherein solid particles of resin produced in step (b) are recovered from the aqueous dispersion.

9. The process of claim 7 wherein the resin is a polyolefin.

10. The process of claim 7 wherein the resin is polyethylene or polypropylene.

11. The process of claim 7 wherein the resin is ethylene-vinyl acetate copolymer.

* * * * *